United States Patent
Hardt (10) Patent No.: US 10,659,365 B2
(45) Date of Patent: May 19, 2020

(54) USING WIRELESS CLIENT FOR PROXY CHANNEL SCAN

(71) Applicant: ARRIS Enterprises, Inc., Suwanee, GA (US)

(72) Inventor: Charles Hardt, Lawrenceville, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 270 days.

(21) Appl. No.: 14/861,363

(22) Filed: Sep. 22, 2015

(65) Prior Publication Data

US 2016/0087897 A1 Mar. 24, 2016

Related U.S. Application Data

(60) Provisional application No. 62/053,344, filed on Sep. 22, 2014.

(51) Int. Cl.
| | |
|---|---|
| *H04L 12/803* | (2013.01) |
| *H04L 12/707* | (2013.01) |
| *H04W 48/16* | (2009.01) |
| *H04W 24/10* | (2009.01) |
| *H04W 84/12* | (2009.01) |
| *H04W 40/34* | (2009.01) |

(52) U.S. Cl.
CPC .......... *H04L 47/122* (2013.01); *H04W 24/10* (2013.01); *H04W 40/34* (2013.01); *H04W 48/16* (2013.01); *H04W 84/12* (2013.01)

(58) Field of Classification Search
CPC ....... H04L 47/122; H04L 45/22; H04L 47/14; H04W 48/16; H04W 48/176
See application file for complete search history.

(56) References Cited

U.S. PATENT DOCUMENTS

| | | |
|---|---|---|
| 2002/0060995 A1 | 5/2002 | Cervello et al. |
| 2005/0245269 A1 | 11/2005 | Demirhan et al. |

(Continued)

FOREIGN PATENT DOCUMENTS

EP   1672839 A2   6/2006

OTHER PUBLICATIONS

PCT Search Report & Written Opinion, RE: Application No. PCT/US2015/051461, dated Dec. 18, 2015.

*Primary Examiner* — Charles C Jiang
*Assistant Examiner* — Voster Preval
(74) *Attorney, Agent, or Firm* — Bart A. Perkins (57) ABSTRACT

Methods, systems, and computer readable media can be operable to facilitate the use of a station as a proxy for scanning one or more wireless channels. Upon a determination that a currently utilized wireless channel has become impaired, an access point may identify one or more idle wireless stations and may request that the one or more idle wireless stations perform a scan of one or more other wireless channels. The identified wireless station(s) may perform a scan of one or more other wireless channels and may provide an indication of the current level of congestion on each respective wireless channel to the access point. Based on the indication of the current congestion levels of each wireless channel, the access point may determine whether a more advantageous channel is available. If a more advantageous channel is available, the access point may tune to the more advantageous channel.

17 Claims, 6 Drawing Sheets

(56) References Cited

U.S. PATENT DOCUMENTS

| | | | |
|---|---|---|---|
| 2006/0214837 A1* | 9/2006 | Liu | G01S 7/021 |
| | | | 342/52 |
| 2010/0153157 A1* | 6/2010 | Wade | G06Q 10/0631 |
| | | | 705/7.12 |
| 2014/0126397 A1* | 5/2014 | Hansen | H04W 36/30 |
| | | | 370/252 |
| 2015/0373636 A1* | 12/2015 | Karaca | H04W 48/20 |
| | | | 370/332 |

* cited by examiner

USING WIRELESS CLIENT FOR PROXY CHANNEL SCAN

CROSS REFERENCE TO RELATED APPLICATION

This application is a non-provisional application claiming the benefit of U.S. Provisional Application Ser. No. 62/053,344, entitled "WiFi Proxy Channel Scan," which was filed on Sep. 22, 2014, and is incorporated herein by reference in its entirety.

TECHNICAL FIELD

This disclosure relates to the scanning of wireless channels.

BACKGROUND

One or more of a plurality of services (e.g., data, video, voice, etc.) may be delivered to a subscriber premise and may be distributed to one or more client devices (e.g., wireless stations) through a central subscriber device such as a customer premise equipment (CPE) device. The central subscriber device may act as or include an access point providing a wireless interface for one or more wireless stations, and the wireless interface may be used to deliver wireless communications to the one or more wireless stations. For example, a tuner associated with the access point may be tuned to a specific channel, and communications (e.g., packets) output from the access point may be delivered to one or more target stations over the specific channel.

At times, a specific channel utilized by an access point may become impaired (e.g., congested). For example, wireless channel congestion may be caused by a large number of stations accessing the access point, high bitrate streams being delivered over the specific channel, or interference caused by devices operating on nearby channels or by neighboring access points utilizing the specific channel. When a wireless channel becomes impaired to the point that the services delivered from an access point to one or more stations begin to degrade, it may become desirable for the access point to switch to a channel that is less impaired. Ideally, the access point would identify a clear channel before tuning away from the currently utilized channel. For example, a clear channel, as the term is used herein, may include a more advantageous channel (e.g., a channel with less congestion than the channel currently tuned to by the access point).

In order to identify a more advantageous channel, an access point would typically need to scan one or more other channels to determine the level of congestion at the other channels. However, when the access point is providing certain vulnerable services (e.g., high bitrate transfers, real-time communications, streaming video, etc.) to one or more stations, the brief tuning of the access point to a different channel for the purpose of scanning the channel may cause an unwanted disruption (e.g., video stalling, macro-blocking, etc.) to the vulnerable services. Moreover, when the different channel is a dynamic frequency selection (DFS) channel, the access point would typically need to scan the channel for at least a predetermined period of time (e.g., sixty (60) seconds) to determine whether a radar signal is present on the channel. The lengthy period of time during which the access point is tuned away from the channel over which services are being delivered to the station(s) may have undesirable effects on the services being provided to those station(s) by the access point. Therefore, a need exists for improving methods and systems for identifying a more advantageous wireless channel.

BRIEF DESCRIPTION OF THE DRAWINGS

Like reference numbers and designations in the various drawings indicate like elements.

DETAILED DESCRIPTION

It is desirable to improve upon methods and systems for identifying a more advantageous (i.e., clear) wireless channel. Methods, systems, and computer readable media can be operable to facilitate the use of a station as a proxy for scanning one or more wireless channels. Upon a determination that a currently utilized wireless channel has become impaired (i.e., congested), an access point may identify one or more idle wireless stations and may request that the one or more idle wireless stations perform a scan of one or more other wireless channels. The identified wireless station(s) may perform a scan of one or more other wireless channels and may provide an indication of the current level of congestion on each respective wireless channel to the access point. Based on the indication of the current congestion levels of each wireless channel, the access point may determine whether a more advantageous channel, such as one with lower utilization, is available. If a more advantageous channel is available, the access point may tune to the more advantageous channel.

An embodiment of the invention described herein may include a method comprising: (a) determining that a first channel is impaired beyond a threshold level, wherein an access point is configured to communicate over the first channel; (b) identifying at least one idle wireless station associated with the access point; (c) outputting a channel scan request to the at least one idle wireless station, wherein the channel scan request comprises a request for the at least one idle wireless station to scan one or more channels and to determine a level of impairment on each of the one or more channels; (d) receiving one or more channel scan reports from the at least one idle wireless station, wherein the one or more channel scan reports comprise an indication of the level of impairment on each respective channel of the one or more channels; (e) determining if a more advantageous channel is available based on the indication of the level of impairment on each respective channel; and (f) if a more advantageous channel is available, configuring the access point to communicate over the more advantageous channel.

According to an embodiment of the invention, an idle wireless station comprises a wireless station that is not receiving a multimedia stream from the access point.

According to an embodiment of the invention, the indication of the level of impairment on a respective channel of the one or more channels comprises one or more metrics associated with the respective channel, the one or more metrics being obtained by the at least one idle wireless station during a scan of the respective channel.

According to an embodiment of the invention, before configuring the access point to communicate over the more advantageous channel, a notification is output to one or more wireless stations associated with the access point, wherein the notification informs the one or more wireless stations of the impending channel change.

According to an embodiment of the invention, the method described above further comprises: (a) wherein a plurality of idle wireless stations is identified; (b) assigning each respective one of a plurality of channels to a respective one of the plurality of idle wireless stations; and (c) wherein the channel scan request output to each respective one of the plurality of idle wireless stations comprises an identification of one or more channels that are assigned to the respective idle wireless station and a request for the respective idle wireless station to scan the one or more channels identified in the channel scan request.

According to an embodiment of the invention, a more advantageous channel comprises a channel that is less impaired than the first channel.

According to an embodiment of the invention, a respective channel scan request output to a respective idle wireless station comprises a request for the respective idle wireless station to scan a dynamic frequency selection (DFS) channel, and wherein the respective idle wireless station is instructed to scan the DFS channel for a radar signal for at least a predetermined period of time.

An embodiment of the invention described herein may include an apparatus comprising: (a) an interface configured to be used to transmit and receive communications over a first channel; and (b) one or more modules configured to: (i) determine that the first channel is impaired beyond a threshold level; (ii) identify at least one idle wireless station associated with the access point; (iii) output a channel scan request to the at least one idle wireless station, wherein the channel scan request comprises a request for the at least one idle wireless station to scan one or more channels and to determine a level of impairment on each of the one or more channels; (iv) receive one or more channel scan reports from the at least one idle wireless station, wherein the one or more channel scan reports comprise an indication of the level of impairment on each respective channel of the one or more channels; (v) determine if a more advantageous channel is available based on the indication of the level of impairment on each respective channel; and (vi) if a more advantageous channel is available, configure the interface to transmit and receive communications over the more advantageous channel.

An embodiment of the invention described herein may include one or more non-transitory computer readable media having instructions operable to cause one or more processors to perform the operations comprising: (a) determining that a first channel is impaired beyond a threshold level, wherein an access point is configured to communicate over the first channel; (b) identifying at least one idle wireless station associated with the access point; (c) outputting a channel scan request to the at least one idle wireless station, wherein the channel scan request comprises a request for the at least one idle wireless station to scan one or more channels and to determine a level of congestion on each of the one or more channels; (d) receiving one or more channel scan reports from the at least one idle wireless station, wherein the one or more channel scan reports comprise an indication of the level of congestion on each respective channel of the one or more channels; (e) determining if a more advantageous channel is available based on the indication of the level of impairment on each respective channel; and (f) if a more advantageous channel is available, configuring the access point to communicate over the more advantageous channel.

Figure 1:
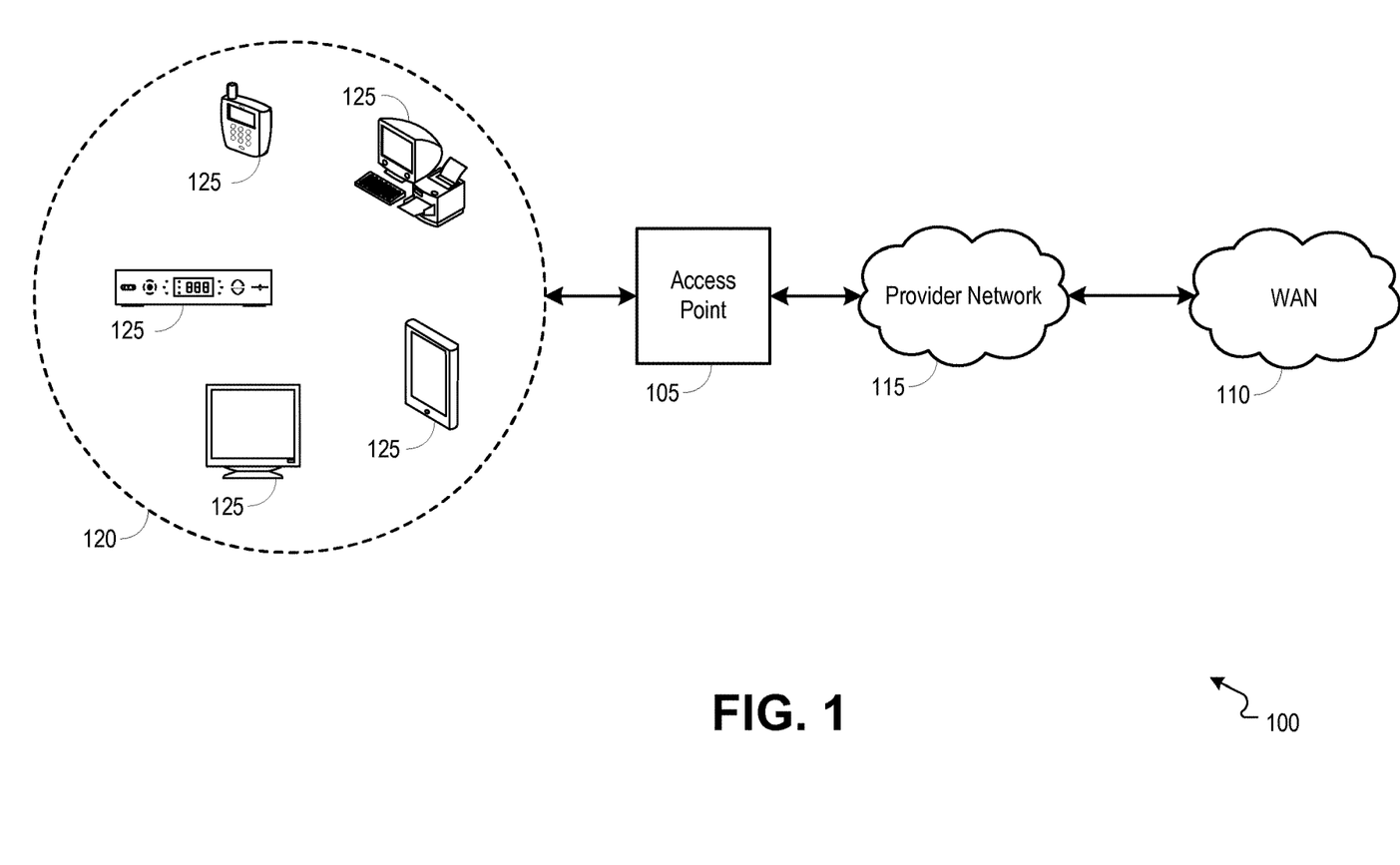
FIG. 1 is a block diagram illustrating an example network environment operable to facilitate the use of a station as a proxy for scanning one or more wireless channels.

FIG. 1 is a block diagram illustrating an example network environment 100 operable to facilitate the use of a station as a proxy for scanning one or more wireless channels. In embodiments, an access point 105 may provide video, audio and/or data services to a subscriber by communicating with a wide area network (WAN) 110 through a connection to a provider network 115 (e.g., hybrid fiber-coaxial network, fiber network, cellular network, high speed data network, etc.). The access point 105 may include or may be embedded within a gateway device (e.g., media gateway device), a broadband modem, a router including an embedded modem, a hotspot router, a wireless extender, or any other device operable to route communications between one or more client devices and a network. The access point 105 may provide a local network 120 for delivering services to one or more client devices (e.g., a local area network (LAN), a wireless local area network (WLAN), a personal area network (PAN), etc.). As is well known in the art, the access point 105 may be connected to a wired local network using Ethernet or multimedia over coax alliance (MoCA) with WAN access provided elsewhere in the LAN.

A subscriber can request, receive and interact with multimedia and/or data services through a wireless client device. A wireless client device may include a wireless station 125 such as a wireless set-top box (STB), computer, mobile device, tablet, television, and any other device operable to receive multimedia and/or data services over a wireless interface. For example, data streams and media streams may be output from an access point 105 to one or more wireless stations 125 over one or more wireless channels (e.g., Wi-Fi channels).

In embodiments, an access point 105 may be tuned to a certain wireless channel, and wireless communications may be output to and received from wireless stations 125 over the certain wireless channel. In some instances, the wireless channel to which the access point 105 is currently tuned may become impaired to a level that can degrade the services (e.g., audio/video services) delivered to wireless stations 125 from the access point 105. For example, channel impairment may arise when utilization of the channel by one or more stations 125 exhausts the resources or capacity available to the channel. Channel impairment may also arise when the channel experiences a certain level of noise or interference (e.g., signal-to-noise (SNR) ratio). When the access point 105 determines that a currently utilized channel has become impaired beyond a threshold level, the access point 105 may search for one or more idle wireless stations 125. An idle wireless station 125 may be a wireless station 125 associated with the access point 105 that is not currently receiving a stream from the access point 105. In embodiments, an idle wireless station 125 may be a wireless station 125 associated with the access point 105 that is not currently receiving a multimedia stream from the access point 105. It should be understood that a wireless station 125 receiving a data stream (e.g., non-real time data transfer, transfer control protocol (TCP) stream, etc.) from the access point 105 may be considered an idle wireless station 125 if the wireless station 125 is not receiving a multimedia stream from the access point 105.

If an idle wireless station 125 is found, the access point 105 may instruct the idle wireless station 125 to scan one or more other wireless channels that are available to the access point 105. The idle wireless station 125 may tune away from the currently utilized channel and tune to the wireless channel identified within the instructions received from the access point 105. The idle wireless station 125 may remain on the identified wireless channel long enough to monitor and record metrics that may be used to indicate the level of impairment currently experienced on the identified wireless channel. As an example, a control message may be output to the idle wireless station 125, the control message instructing the wireless station 125 to change its operation to act as an access point. While operating as an access point, the station 125 may perform a scan of one or more available channels. Those skilled in the relevant art will appreciate that various metrics may be used to indicate the level of impairment on a wireless channel (e.g., available bandwidth, number of client devices served, SNR, etc.).

Where a wireless station 125 is instructed to scan multiple wireless channels, the wireless station 125 may tune to each of the wireless channels and record metrics observed for each of the wireless channels. For example, when the wireless station 125 tunes to a channel, the wireless station 125 may observe and/or measure the level of congestion (e.g., the percentage of the channel capacity that is in use) on the wireless channel. The wireless station 125 may observe and/or measure the signal quality of the channel (e.g., signal-to-noise ratio (SNR)). While the wireless station 125 is tuned to a channel, the wireless station 125 may receive broadcast messages from one or more devices transmitting communications over the channel (e.g., beacon messages), and the wireless station 125 may determine the level of congestion on the channel based upon the received messages. After scanning each of the one or more wireless channels, the wireless station 125 may generate and output one or more reports to the access point 105. The one or more reports may include the metrics observed for the one or more wireless channels (e.g., channel congestion, signal quality, etc.) and may provide an indication of the quality or level of impairment of each of the one or more wireless channels.

In embodiments, where an identified wireless channel is a dynamic frequency selection (DFS) channel, the wireless station 125 may tune to the DFS channel for at least a predetermined amount of time (e.g., sixty (60) seconds) to determine whether radar is detected on the DFS channel. When scanning a DFS channel, the wireless station 125 may be required to remain tuned to the DFS channel for a continuous predetermined amount of time. If radar is detected on the DFS channel, the access point 105 will not be allowed to use the DFS channel. If, after the predetermined amount of time, no radar is detected on the DFS channel, the wireless station 125 may output a response to the access point 105 informing the access point 105 that the access point 105 may tune to the identified DFS channel.

In embodiments, based on the one or more reports received from one or more idle wireless stations 125, the access point 105 may determine whether one or more advantageous channels are available for use by the access point 105. The access point 105 may determine the level of impairment on each of one or more wireless channels based on the information included within the one or more reports received from the idle wireless station(s) 125. The access point 105 may identify a wireless channel as a more advantageous wireless channel when the access point 105 determines that the level of impairment on the wireless channel is less than the level of impairment currently experienced on the channel to which the access point 105 is tuned. In embodiments, the access point 105 may identify a wireless channel as a more advantageous channel when the level of congestion (or SNR) on the channel is less than the level of congestion (or SNR) of the currently utilized channel by a predetermined amount.

When a more advantageous wireless channel is identified, the access point 105 may tune to the identified channel and may begin transmitting and receiving wireless communications to and from wireless stations 125 over the identified channel. In embodiments, the access point 105 may be configured to wait for a predetermined amount of time before making a subsequent channel change.

Figure 2:
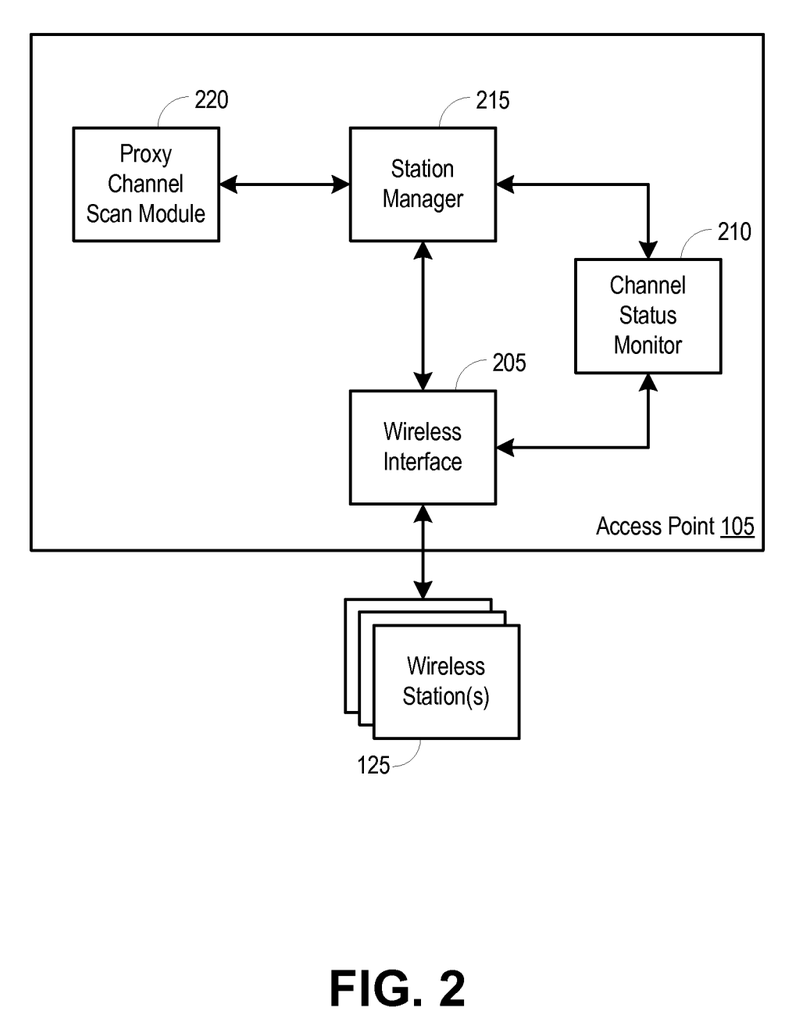
FIG. 2 is a block diagram illustrating an example access point operable to facilitate the use of a station as a proxy for scanning one or more wireless channels.

FIG. 2 is a block diagram illustrating an example access point 105 operable to facilitate the use of a station as a proxy for scanning one or more wireless channels. The access point 105 may include a wireless interface 205, channel status monitor 210, station manager 215, and proxy channel scan module 220.

The access point 105 may transmit wireless communications to and receive wireless communications from one or more wireless stations 125 and/or one or more other access points 105 through the wireless interface 205. In embodiments, wireless communications may be delivered to and from the access point 105 over a wireless channel that is currently tuned to by the access point 105. For example, the wireless interface 205 may be tuned to a specific wireless channel (e.g., a channel of a set of Wi-Fi channels). The wireless channel may also be utilized by other devices within and by devices outside of a subscriber premise associated with the access point 105, and the wireless channel may reach a level of congestion that can adversely affect data streams and/or multimedia streams being delivered from the access point 105 to one or more wireless stations 125.

In embodiments, the channel status monitor 210 may monitor the level of impairment of a wireless channel to which the access point 105 is currently tuned. The channel status monitor 210 may retrieve and monitor metrics associated with the transmission and reception of communications along a wireless channel through the wireless interface 205. It should be understood that channel impairment may be determined based upon a variety of metrics (e.g., transmit buffer status, available bandwidth, number of stations communicating over the channel, SNR, etc.). In embodiments, clear channel assessment (CCA) may be used to determine the current quality of a channel at the access point 105. Metrics used to indicate a level of channel impairment may include non-Wi-Fi noise, congestion caused by other Wi-Fi transmissions, and other metrics commonly understood in the art.

When the channel status monitor 210 determines that a wireless channel currently being utilized by the access point 105 has reached a predetermined threshold level of impairment (e.g., a level of congestion that may adversely affect communications transmitted from and received by the access point 105 or a SNR above a certain level), the channel status monitor 210 may initiate a process for scanning other wireless channels through one or more wireless stations 125 acting as proxies.

In embodiments, when a determination is made that a currently utilized wireless channel has reached a level of impairment that is greater than a predetermined threshold and that impairment levels of other wireless channels should be checked, the station manager 215 may determine whether one or more wireless stations 125 are available to conduct a scan of one or more other wireless channels. The station manager 215 may monitor the status of each of one or more wireless stations 125 associated with the access point 105. For example, the station manager 215 may determine the status of an associated wireless station 125 based upon whether a multimedia stream is currently being output from the access point 105 to the wireless station 125. The station manager 215 may monitor the output of streams to associated wireless stations 125 using acknowledgement messages received at the access point 105 from the wireless stations 125 (e.g., active stream acknowledgment messages).

The station manager 215 may determine whether at least one of the wireless stations 125 associated with the access point 105 is idle. A wireless station 125 may be identified as idle when the determination is made that the wireless station 125 is not currently receiving a data stream or multimedia stream from the access point 105. The determination that a wireless station 125 is idle may be based on a lapse of time since an active stream acknowledgment message was last received at the access point 105 from the wireless station 125. It should be understood that a station 125 may be classified as idle if the station 125 is currently receiving a data stream (e.g., non-real time transfer, transfer allowing higher latency, TCP transfer, etc.) but is not currently receiving a media stream (e.g., video, audio, real-time transfer, transfer with low-latency requirements, etc.). For example, when there are no stations 125 that are not receiving a data stream or media stream from the access point 105, a station 125 that is only receiving a data stream may be identified as idle because a channel switch will not impact the data stream as significantly as a channel switch would impact a media stream.

In embodiments, a wireless station 125 that is transmitting (e.g., transmitting content) may not be identified as an idle wireless station 125.

In embodiments, an identified idle wireless station 125 may be in a low-power mode (e.g., sleep mode). Where an identified idle wireless station 125 is in a low-power mode, the access point 105 may send a message to the idle wireless station 125, wherein the message causes the wireless station 125 to exit the low-power mode.

If at least one wireless station 125 is determined to be idle, the proxy channel scan module 220 may generate a request for the at least one wireless station 125 to scan one or more wireless channels that are available to the access point 105. The request may instruct one or more idle wireless stations 125 to scan all the wireless channels available to the access point 105 or only a subset of the wireless channels available to the access point 105 (e.g., only non-overlapping wireless channels, only wireless channels preferred by a subscriber, etc.). In embodiments, where a plurality of idle wireless stations 125 are available, each respective one of the plurality of idle wireless stations 125 may be assigned to scan one or more wireless channels that are not being scanned by the other stations of the plurality of idle wireless stations 125. The generated request may be output to each of the one or more idle wireless stations 125 through the wireless interface 205.

In embodiments, the access point 105 may control transmissions to a wireless station 125, and may instruct the wireless station 125 to tune away from a current channel in between transmissions being made from the access point 105 to the wireless station 125.

In embodiments, the one or more idle wireless stations 125 may scan one or more wireless channels according to the instructions received from the access point 105. For example, a wireless station 125 may scan a wireless channel to determine the level of impairment on the wireless channel. It will be appreciated by those skilled in the relevant art that various measurements may be taken and various metrics may be used to determine the level of impairment on a wireless channel. Each of the one or more idle wireless stations 125 may generate a report for each of the scanned wireless channels, wherein the report includes the metrics observed for the respective channel and provides an indication of the level of impairment currently experienced by the respective channel. The reports may be output from the idle wireless station(s) 125 to the access point 105.

In embodiments, the proxy channel scan module 220 may review the report(s) received from the one or more idle wireless stations 125 and may determine whether one or more more advantageous wireless channels are available to the access point 105. The determination whether one or more more advantageous wireless channels are available to the access point 105 may be based upon the level of impairment for each available wireless channel as indicated by the report(s) received from the one or more idle wireless stations 125. For example, a more advantageous wireless channel may be a wireless channel with less congestion than the congestion currently experienced on the wireless channel to which the access point 105 is currently tuned. Where multiple clear wireless channels are identified by the proxy channel scan module 220, the proxy channel scan module 220 may identify the most advantageous wireless channel having the lowest level of impairment relative to the other identified wireless channels.

In embodiments, the proxy channel scan module 220 may initiate the tuning of the access point 105 to the identified more advantageous wireless channel. For example, the proxy channel scan module 220 may cause the wireless interface 205 to tune away from the currently utilized wireless channel and to tune to the identified more advantageous wireless channel.

Figure 3:
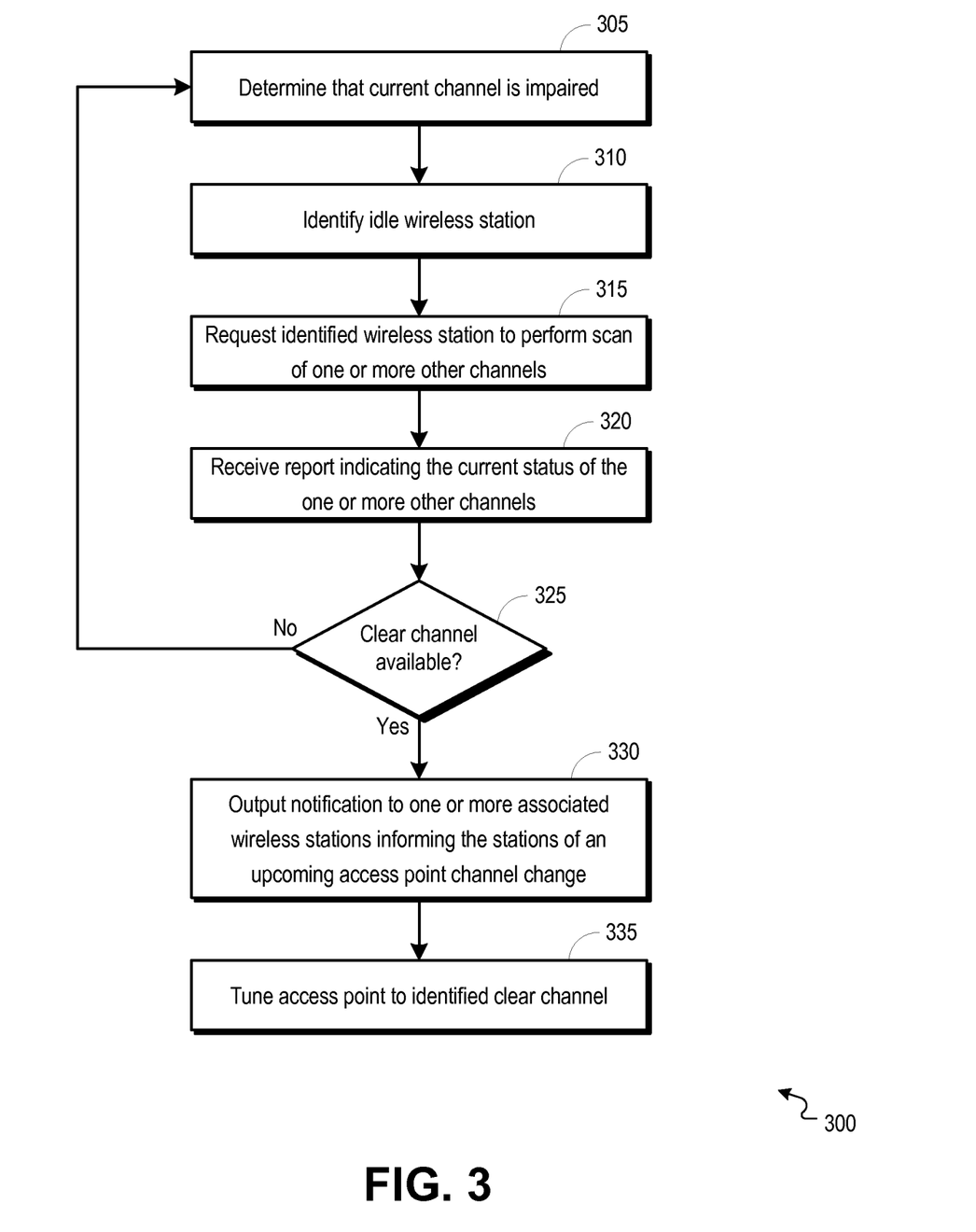
FIG. 3 is a flowchart illustrating an example process operable to facilitate the use of a station as a proxy for scanning one or more wireless channels.

FIG. 3 is a flowchart illustrating an example process 300 operable to facilitate the use of a station as a proxy for scanning one or more wireless channels. The process 300 may begin at 305 when the determination is made that a channel being used by an access point 105 of FIG. 1 is impaired. The determination that a currently utilized channel is impaired may be made, for example, by a channel status monitor 210 of FIG. 2. In embodiments, the determination that a channel is impaired may be based upon one or more metrics (e.g., transmit buffer status, available bandwidth, number of stations communicating over the channel, SNR etc.) observed on the channel. For example, the channel status monitor 210 may retrieve one or more metrics associated with a wireless channel from a wireless interface 205 of FIG. 2. Channel congestion may be calculated based upon a percentage of transmission attempts that are successful along the channel. For example, the access point 105 may make a certain number of transmission attempts (e.g., say one-hundred (100) attempts). If the access point 105 is able to make all one-hundred transmissions without having to wait for a transmission opportunity, then the channel may be considered to be 0% congested. If the access point 105 has to wait for a transmission opportunity during ten (10) of the one-hundred transmissions, then the channel may be considered to be 10% congested. It should be understood that the decision to check the quality of other channels may be made when the currently utilized channel experiences interference (e.g., SNR) above a predetermined level.

At 310, an idle wireless station may be identified. An idle wireless station may be identified, for example, by the access point 105 (e.g., by a station manager 215 of FIG. 2). In embodiments, the station manager 215 may maintain a list of stations 125 that are associated with the access point 105 and may determine whether one or more of the stations 125 associated with the access point 105 are not currently receiving a data stream or media stream from the access point 105. For example, the station manager 215 may determine whether an active stream acknowledgement message has been received by the access point 105 (e.g., through a wireless interface 205 of FIG. 2) from each respective one of the one or more stations 125. When the station manager 215 identifies an associated station 125 from which an active stream acknowledgement message has not been received within a predetermined period of time, the station manager 215 may identify the station 125 as an idle station. It should be understood that a station 125 may be classified as idle where the station 125 is currently receiving a data stream but is not currently receiving a media stream. For example, when there are no stations 125 that are not receiving a data stream or media stream from the access point 105, a station 125 that is only receiving a data stream may be identified as idle because a channel switch will not impact the data stream as significantly as a channel switch would impact a media stream.

At 315, the identified idle wireless station 125 may be requested to perform a scan of one or more other wireless channels. The request may be output to the identified wireless station 125 from the access point 105 (e.g., from the proxy channel scan module 220 of FIG. 2). In embodiments, the request may identify one or more wireless channels available to the access point 105 that are to be scanned by the station 125. The request may further ask for a status report of the identified one or more wireless channels, wherein the status report provides an indication of the level of impairment on the identified one or more channels. The identified idle wireless station 125 may complete a scan of each of the one or more identified channels, and may generate a report for each respective one of the one or more identified channels based upon the scan conducted for the respective channel. For example, the report for a channel may include a channel identifier (e.g., channel number), congestion level (e.g., percentage of channel capacity that is in use), channel noise/interference (e.g., SNR), and/or other metrics. In embodiments, the access point 105 may determine which channel(s) each of the identified idle wireless station(s) 125 and/or any of one or more wireless stations 125 associated with the access point 105 are configured to support, and the identified idle wireless station(s) 125 may be requested to perform a scan on only those channel(s) supported by the idle wireless station(s) 125 or by the one or more wireless stations 125 associated with the access point 105.

At 320, one or more reports indicating the current status of one or more wireless channels may be received. The report(s) may be received at the access point 105 from the identified idle wireless station. In embodiments, the report(s) may provide an indication of the current level of impairment of one or more wireless channels that are available to the access point 105. The access point 105 may review the one or more reports to determine the current level of impairment on the one or more other channels that are not currently being utilized by the access point 105. For example, the one or more reports may be reviewed by the proxy channel scan module 220 of FIG. 2.

At 325, the determination may be made whether a clear (e.g., more advantageous channel) is available for use by the access point 105. The determination may be made, for example, by the access point 105 (e.g., by the proxy channel scan module 220), and may be based upon the one or more reports received from the identified idle wireless station. In embodiments, a clear (e.g., more advantageous channel) may be an open channel (e.g., a channel that currently has no traffic or interference) or may be a channel that is currently experiencing less congestion than the channel currently utilized by the access point 105. It should be understood that various channel metrics may be used to indicate the current level of impairment of a wireless channel. For example, the determination that a more advantageous channel is available to the access point 105 may be based on a report indicating that at least one of the one or more other channels has more available bandwidth than the current channel, is serving a fewer number of client devices than the current channel, and/or other metrics that can provide an indication of the level of congestion on the at least one other channel. If the determination is made that there are no more advantageous channels available to the access point 105, the process 300 may return to 305 where the determination may be made whether the current channel remains impaired. In embodiments, the access point 105 may wait to receive a predetermined number of reports (e.g., a number of reports indicating the current status of a certain number of channels or a number of reports indicating the status of the same channel) or may wait for a predetermined duration of time before returning to 305. For example, the access point 105 may receive multiple reports indicating the status of a single channel before determining that no more advantageous channels are available.

If, at 325, the determination is made that at least one more advantageous channel is available to the access point 105, the process 300 may proceed to 330. At 330, a notification may be output to one or more wireless stations (e.g., wireless stations 125 of FIG. 1) associated with the access point 105, the notification informing each of the one or more wireless stations of an upcoming channel change by the access point 105. The notification may be generated at the access point 105 (e.g., by the proxy channel scan module 220) and output through the wireless interface 205 of FIG. 2 to the one or more wireless stations 125 associated with the access point 105. The notification may indicate to the one or more wireless stations 125 the more advantageous channel identified by the access point 105 at 325, and the wireless stations 125 may begin receiving and transmitting communications over the identified channel.

At 335, the access point 105 may tune to the identified more advantageous channel. For example, the proxy channel scan module 220 may initiate the tuning of the access point 105 to the identified more advantageous channel. After tuning to the identified more advantageous channel, the access point 105 may transmit and receive wireless communications over the identified more advantageous channel. In embodiments, the access point 105 may continue to monitor the identified channel after tuning to the identified channel.

Figure 4:
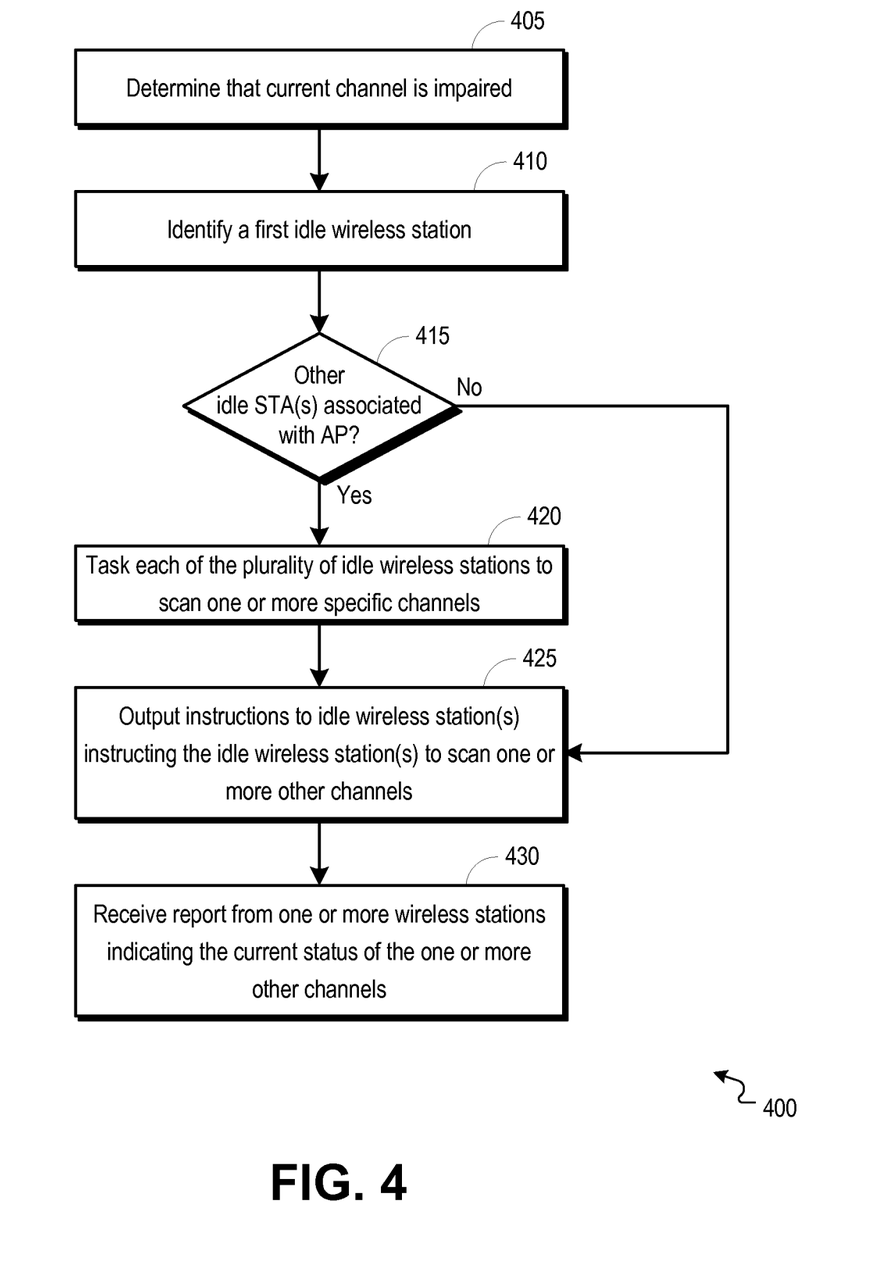
FIG. 4 is a flowchart illustrating an example process operable to facilitate the use of one or more stations as proxies for scanning one or more wireless channels.

FIG. 4 is a flowchart illustrating an example process 400 operable to facilitate the use of one or more stations as proxies for scanning one or more wireless channels. The process 400 may begin at 405 when the determination is made that a channel being used by an access point 105 of FIG. 1 is impaired. The determination that a currently utilized channel is impaired may be made, for example, by a channel status monitor 210 of FIG. 2. In embodiments, the determination that a channel is impaired may be based upon one or more metrics (e.g., transmit buffer status, available bandwidth, number of stations communicating over the channel, SNR, etc.) observed on the channel. For example, the channel status monitor 210 may retrieve one or more metrics associated with a wireless channel from a wireless interface 205 of FIG. 2.

At 410, a first idle wireless station may be identified. A first idle wireless station may be identified, for example, by the access point 105 (e.g., by a station manager 215 of FIG. 2). In embodiments, the station manager 215 may maintain a list of stations 125 that are associated with the access point 105 and may determine whether one or more of the stations 125 associated with the access point 105 are not currently receiving a data stream or media stream from the access point 105. For example, the station manager 215 can determine whether an active stream acknowledgement message has been received by the access point 105 (e.g., through a wireless interface 205 of FIG. 2) from each respective one of the one or more stations 125. When the station manager 215 identifies an associated station 125 from which an active stream acknowledgement message has not been received within a predetermined period of time, the station manager 215 may identify the station 125 as an idle station. It should be understood that a station 125 may be identified as idle where the station 125 is currently receiving a data stream but is not currently receiving a media stream. For example, when there are no stations 125 that are not receiving a data stream or media stream from the access point 105, a station 125 that is only receiving a data stream may be identified as idle because a channel switch will not impact the data stream as significantly as a channel switch would impact a media stream.

At 415, the determination may be made whether one or more other idle wireless stations 125 are associated with the access point 105. The determination whether one or more other idle wireless stations 125 are associated with the access point 105 may be made, for example, by the access point 105 (e.g., by a station manager 215 of FIG. 2). If the determination is made that one or more other idle wireless stations 125 are associated with the access point 105, the process 400 may proceed to 420. If the determination is made that there are no other idle wireless stations 125 associated with the access point 105, then 420 may be skipped and the process 400 may proceed to 425.

At 420, each respective one of the plurality of idle wireless stations 125 may be tasked to scan one or more specific channels. Where a plurality of wireless channels are available to an access point 105 (e.g., channels 1-14), the plurality of wireless channels may be allocated amongst the wireless stations 125 for scanning. The wireless channels may be allocated amongst the wireless stations 125, for example, by the proxy channel scan module 220 of FIG. 2. The proxy channel scan module 220 may divide the wireless channels up amongst the wireless stations 125 and may task one or more individual stations 125 with scanning one or more wireless channels. For example, each of the one or more individual stations 125 may only be tasked with scanning a single channel, or some number of channels that is less than all of the wireless channels available to the access point 105. In embodiments, the access point 105 may only designate a sub-set of the available wireless channels for scanning by the plurality of idle wireless stations 125. For example, the access point 105 may only designate non-overlapping channels (e.g., channels 1, 6, 11, and 14) for scanning by the plurality of idle wireless stations 125.

At 425, instructions may be output to the one or more idle wireless stations instructing the idle wireless station(s) to scan one or more channels that are available to the access point 105. The instructions may be output to the identified wireless station(s) 125 from the access point 105 (e.g., from the proxy channel scan module 220 of FIG. 2). In embodiments, the instructions may identify one or more wireless channels available to the access point 105 that are to be scanned by the station 125. For example, the instructions output to each respective one of the one or more wireless stations 125 may be different than the instructions output to other wireless stations 125, wherein the instructions may instruct the respective wireless station 125 to scan one or more wireless channels that are not being scanned by the other wireless station(s) 215 associated with the access point 105. The request may further ask for a status report of the identified one or more wireless channels, wherein the status report provides an indication of the specific impairments on the identified one or more channels. The identified idle wireless station(s) 125 may complete a scan of each of the one or more identified channels, and may generate a report for each respective one of the one or more identified channels based upon the scan conducted for the respective channel.

At 430, one or more reports indicating the current status of one or more wireless channels may be received. The report(s) may be received at the access point 105 from the identified idle wireless station(s) 125. In embodiments, the report(s) may provide an indication of the current impairments present on one or more wireless channels that are available to the access point 105. The access point 105 may review the one or more reports to determine the current level of impairment on the one or more other channels that are not currently being utilized by the access point 105. For example, the one or more reports may be reviewed by the proxy channel scan module 220 of FIG. 2. The information conveyed by the report(s) may be used by the proxy channel scan module 220 to determine whether a more advantageous channel is available to the access point 105.

Figure 5:
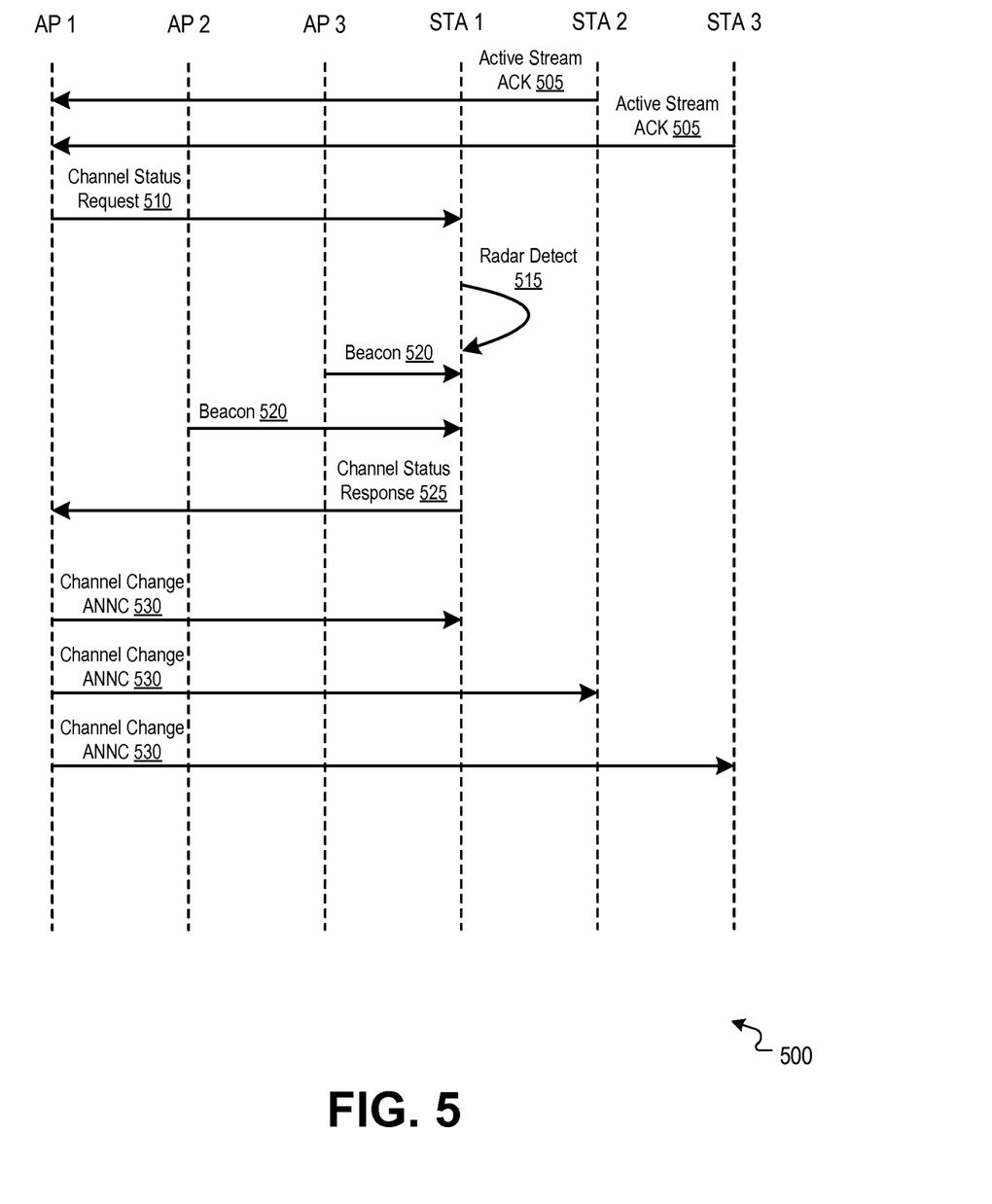
FIG. 5 is a communication flow diagram showing communications that may facilitate a channel scan at a proxy station for an access point.

FIG. 5 is a communication flow diagram 500 showing communications that may facilitate a channel scan at a proxy station for an access point 105. A first access point 105 of FIG. 1 (e.g., AP 1) may determine whether one or more stations (e.g., STA 1-3) are idle based on whether or not an active stream acknowledgment 505 is received from the station. According to the flow diagram 500, STA 1 may be determined to be idle because no active stream acknowledgement 505 has been received by AP 1 from STA 1, whereas STA 2 and STA 3 are not idle because an active stream acknowledgment 505 has been received by AP 1 from both STA 2 and STA 3.

The first access point 105 (AP 1) may output a channel status request 510 to the idle station (STA 1), wherein the channel status request 510 instructs the idle station to scan one or more wireless channels. In response to receiving the channel status request 510, STA 1 may tune to and scan one or more wireless channels. If the wireless channel is a DFS channel, STA 1 may remain tuned to the channel for a predetermined period of time (e.g., sixty (60) seconds) to determine whether a radar is detected (e.g., radar detect 515).

Once tuned to a channel, STA 1 may receive messages broadcast on the channels. For example, STA 1 may receive beacons 520 from AP 2 and AP 3 that are operating on a channel being scanned by STA 1. STA 1 may determine the current status of a channel (e.g., congestion level, SNR, etc.) and may inform AP1 of the channel status. For example, a channel status response 525 may be output from STA 1 to AP1, wherein the channel status response 525 includes metrics observed during a scan of the channel by STA1.

Using information included within a channel status response 525, AP 1 may determine that a more advantageous channel is available and may tune to the identified more advantageous channel. AP 1 may output a channel change announcement 530 to each associated station (e.g., STA 1-3), the channel change announcement 530 informing the stations that AP 1 will be tuned to a new wireless channel.

Figure 6:
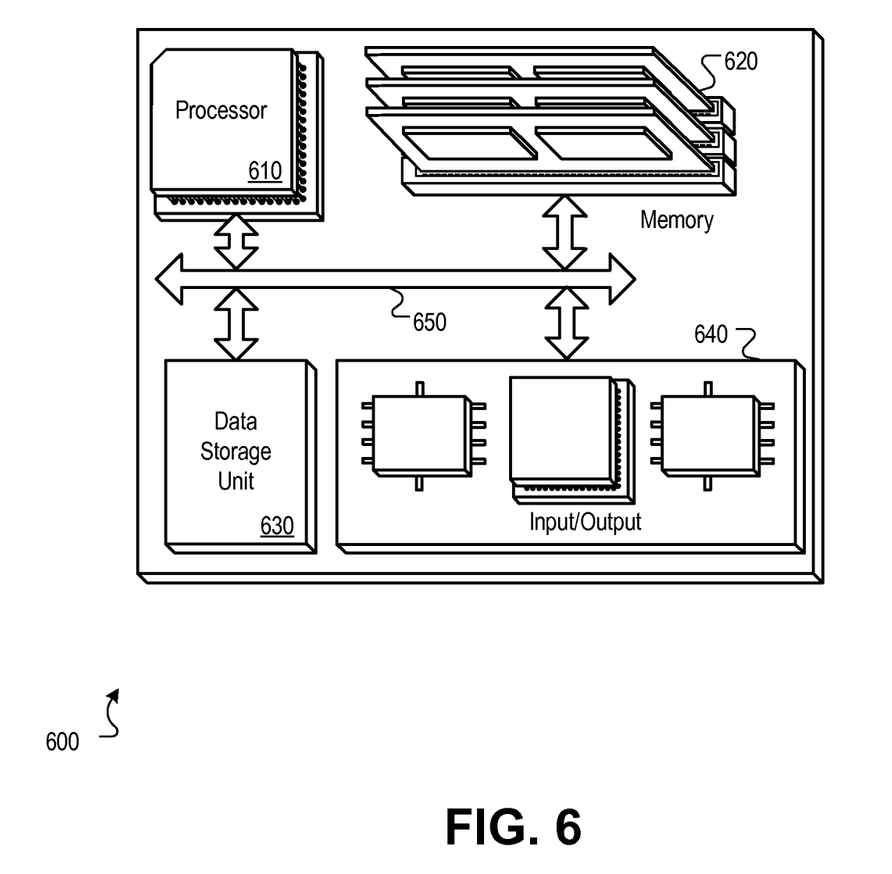
FIG. 6 is a block diagram of a hardware configuration operable to facilitate the use of a station as a proxy for scanning one or more wireless channels.

FIG. 6 is a block diagram of a hardware configuration 600 operable to facilitate the use of a station as a proxy for scanning one or more wireless channels. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In embodiments, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device (e.g., wireless stations 125 of FIG. 1 such as a wireless STB, television, computer, tablet, mobile device, etc.). In embodiments, the input/output device can include driver devices configured to send communications to, and receive communications from one or more networks (e.g., local network 120 of FIG. 1, provider network 115 of FIG. 1, WAN 110 of FIG. 1, etc.).

Those skilled in the art will appreciate that the invention improves upon methods and systems for identifying a less impaired wireless channel. Methods, systems, and computer readable media can be operable to facilitate the use of a station as a proxy for scanning one or more wireless channels. Upon a determination that a currently utilized wireless channel has become impaired, an access point may identify one or more idle wireless stations and may request that the one or more idle wireless stations perform a scan of one or more other wireless channels. The identified wireless station(s) may perform a scan of one or more other wireless channels and may provide an indication of the current level of congestion on each respective wireless channel to the access point. Based on the indication of the current congestion levels of each wireless channel, the access point may determine whether a more advantageous channel is available. If a more advantageous channel is available, the access point may tune to the more advantageous channel.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   determining that a first channel is impaired beyond a threshold level, wherein an access point is configured to communicate over the first channel, and wherein determining that the first channel is impaired beyond a threshold level comprises, determining that resources available to the first channel are exhausted from utilisation of the first channel by one or more wireless stations;
   identifying at least one idle wireless station associated with the access point;
   outputting a channel scan request to the at least one idle wireless station, wherein the channel scan request comprises a request for the at least one idle wireless station to scan one or more channels and to determine a level of impairment on each of the one or more channels;
   receiving one or more channel scan reports from the at least one idle wireless station, wherein the one or more channel scan reports comprise an indication of the level of impairment on each respective channel of the one or more channels, wherein the indication of the level of impairment on each respective channel comprises an indication of a congestion level of the respective channel and one or more signal quality metrics, wherein the indication of the level of congestion and the one or more signal quality metrics are obtained by the at least one idle wireless station from one or more broadcast messages that are received by the at least one idle wireless station while the at least one idle wireless station is tuned to the respective channel;
   based upon the indication of the level of impairment on each respective channel of the one or more channels carried by the one or more channel scan reports, determining a level of impairment on each respective channel of the one or more channels;
   determining if a more advantageous channel is available based on the indication of the level of impairment on each respective channel, wherein determining if a more advantageous channel is available comprises determining whether a level of impairment on at least one channel of the one or more channels is less than a level of impairment on the first channel; and
   if a more advantageous channel is available, configuring the access point to communicate over the more advantageous channel.

2. The method of claim 1, wherein an idle wireless station comprises a wireless station that is not receiving a multimedia stream from the access point.

3. The method of claim 1, further comprising:
   before configuring the access point to communicate over the more advantageous channel, outputting a notification to one or more wireless stations associated with the access point, wherein the notification informs the one or more wireless stations of the impending channel change.

4. The method of claim 1, further comprising:
   wherein a plurality of idle wireless stations is identified;
   assigning each respective one of a plurality of channels to a respective one of the plurality of idle wireless stations; and
   wherein the channel scan request output to each respective one of the plurality of idle wireless stations comprises an identification of one or more channels that are assigned to the respective idle wireless station and a request for the respective idle wireless station to scan the one or more channels identified in the channel scan request.

5. The method of claim 1, wherein a more advantageous channel comprises a channel that is less impaired than the first channel.

6. The method of claim 1, wherein a respective channel scan request output to a respective idle wireless station comprises a request for the respective idle wireless station to scan a dynamic frequency selection (DFS) channel, and wherein the respective idle wireless station is instructed to scan the DFS channel for a radar signal for at least a predetermined period of time.

7. An apparatus comprising:
   an interface configured to be used to transmit and receive communications over a first channel; and
   one or more modules configured to:
   determine that the first channel is impaired beyond a threshold level, wherein determining that the first channel is impaired beyond a threshold level comprises, determining that resources available to the first channel are exhausted from utilisation of the first channel by one or more wireless stations;
   identify at least one idle wireless station associated with the access point;
   output a channel scan request to the at least one idle wireless station, wherein the channel scan request comprises a request for the at least one idle wireless station to scan one or more channels and to determine a level of impairment on each of the one or more channels;

receive one or more channel scan reports from the at least one idle wireless station, wherein the one or more channel scan reports comprise an indication of the level of impairment on each respective channel of the one or more channels, wherein the indication of the level of impairment on each respective channel comprises an indication of a congestion level of the respective channel and one or more signal quality metrics, wherein the indication of the level of congestion and the one or more signal quality metrics are obtained by the at least one idle wireless station from one or more broadcast messages that are received by the at least one idle wireless station while the at least one idle wireless station is tuned to the respective channel;

based upon the indication of the level of impairment on each respective channel of the one or more channels carried by the one or more channel scan reports, determine a level of impairment on each respective channel of the one or more channels;

determine if a more advantageous channel is available based on the indication of the level of impairment on each respective channel, wherein determining if a more advantageous channel is available comprises determining whether a level of impairment on at least one channel of the one or more channels is less than a level of impairment on the first channel; and if a more advantageous channel is available, configure the interface to transmit and receive communications over the more advantageous channel.

8. The apparatus of claim 7, wherein an idle wireless station comprises a wireless station that is not receiving a multimedia stream.

9. The apparatus of claim 7, wherein the interface is configured to be used to:

output a notification to one or more wireless stations, wherein the notification informs the one or more wireless stations of the impending channel change.

10. The apparatus of claim 7, wherein the one or more modules are further configured to:

wherein a plurality of idle wireless stations is identified;

assign each respective one of a plurality of channels to a respective one of the plurality of idle wireless stations; and wherein the channel scan request output to each respective one of the plurality of idle wireless stations comprises an identification of one or more channels that are assigned to the respective idle wireless station and a request for the respective idle wireless station to scan the one or more channels identified in the channel scan request.

11. The apparatus of claim 7, wherein a more advantageous channel comprises a channel that is less impaired than the first channel.

12. One or more non-transitory computer readable media having instructions operable to cause one or more processors to perform the operations comprising:

determining that a first channel is impaired beyond a threshold level, wherein an access point is configured to communicate over the first channel, and wherein determining that the first channel is impaired beyond a threshold level comprises, determining that resources available to the first channel are exhausted from utilisation of the first channel by one or more wireless stations;

identifying at least one idle wireless station associated with the access point;

outputting a channel scan request to the at least one idle wireless station, wherein the channel scan request comprises a request for the at least one idle wireless station to scan one or more channels and to determine a level of impairment on each of the one or more channels;

receiving one or more channel scan reports from the at least one idle wireless station, wherein the one or more channel scan reports comprise an indication of the level of impairment on each respective channel of the one or more channels, wherein the indication of the level of impairment on each respective channel comprises an indication of a congestion level of the respective channel and one or more signal quality metrics, wherein the indication of the level of congestion and the one or more signal quality metrics are obtained by the at least one idle wireless station from one or more broadcast messages that are received by the at least one idle wireless station while the at least one idle wireless station is tuned to the respective channel;

based upon the indication of the level of impairment on each respective channel of the one or more channels carried by the one or more channel scan reports, determining a level of impairment on each respective channel of the one or more channels;

determining if a more advantageous channel is available based on the indication of the level of impairment on each respective channel, wherein determining if a more advantageous channel is available comprises determining whether a level of impairment on at least one channel of the one or more channels is less than a level of impairment on the first channel; and if a more advantageous channel is available, configuring the access point to communicate over the more advantageous channel.

13. The one or more non-transitory computer-readable media of claim 12, wherein an idle wireless station comprises a wireless station that is not receiving a multimedia stream from the access point.

14. The one or more non-transitory computer-readable media of claim 12, wherein the instructions are further operable to cause one or more processors to perform the operations comprising:

before configuring the access point to communicate over the more advantageous channel, outputting a notification to one or more wireless stations associated with the access point, wherein the notification informs the one or more wireless stations of the impending channel change.

15. The one or more non-transitory computer-readable media of claim 12, wherein the instructions are further operable to cause one or more processors to perform the operations comprising:

wherein a plurality of idle wireless stations is identified;

assigning each respective one of a plurality of channels to a respective one of the plurality of idle wireless stations; and wherein the channel scan request output to each respective one of the plurality of idle wireless stations comprises an identification of one or more channels that are assigned to the respective idle wireless station and a request for the respective idle wireless station to scan the one or more channels identified in the channel scan request.

16. The one or more non-transitory computer-readable media of claim 12, wherein a more advantageous channel comprises a channel that is less impaired than the first channel.

17. The one or more non-transitory computer-readable media of claim 12, wherein a respective channel scan request output to a respective idle wireless station comprises a request for the respective idle wireless station to scan a dynamic frequency selection (DFS) channel, and wherein the respective idle wireless station is instructed to scan the DFS channel for a radar signal for at least a predetermined period of time.

* * * * *